(12) United States Patent
Molesky et al.

(10) Patent No.: US 9,105,118 B2
(45) Date of Patent: Aug. 11, 2015

(54) GALAXY VIEWS FOR VISUALIZING LARGE NUMBERS OF NODES

(71) Applicant: Oracle International Corporation, Redwood Shores, CA (US)

(72) Inventors: Lory Molesky, Lexington, MA (US); Benjamin L. Moroze, Lexington, MA (US); Kris Hanson, Stoneham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 13/726,084

(22) Filed: Dec. 22, 2012

(65) Prior Publication Data

US 2013/0113820 A1 May 9, 2013

Related U.S. Application Data

(63) Continuation of application No. 13/048,781, filed on Mar. 15, 2011.

(51) Int. Cl.
*G06F 3/00* (2006.01)
*G06T 11/00* (2006.01)
*G06F 3/01* (2006.01)
*G06F 3/0481* (2013.01)
*G06F 17/30* (2006.01)

(52) U.S. Cl.
CPC .......... *G06T 11/00* (2013.01); *G06F 17/30572* (2013.01); *G06F 3/0481* (2013.01); *G06F 17/30867* (2013.01)

(58) Field of Classification Search
CPC .............. G06T 11/00; G06F 17/30572; G06F 17/30867; G06F 3/0481
USPC .................................. 715/768, 805, 834, 835
See application file for complete search history.

(56) References Cited

U.S. PATENT DOCUMENTS 6,219,053 B1 * 4/2001 Tachibana et al. ............ 715/835
7,106,329 B1 * 9/2006 Miller et al. .................. 345/440

(Continued)

OTHER PUBLICATIONS

Jiang, Wei, et al., "Information Visualization of an agent based financial system", obtained at http://ideas.repec.org/p/sce/scecf5/468.html; Nov. 11, 2005; 2 pages.

(Continued)

*Primary Examiner* — Nicholas Augustine
(74) *Attorney, Agent, or Firm* — Trellis IP Law Group, PC

(57) ABSTRACT

A system and method for illustrating data. An example method includes organizing the data into objects; assigning a transparency value to each object; and graphically depicting the data by distributing nodes representing the objects in a region of a visualization in accordance with a distribution method or function. Each node is displayed as partially transparent in accordance with the transparency value. In a more specific embodiment, the visualization includes a galaxy visualization with nodes that are randomly or pseudo randomly distributed about a center point or region of the visualization.

18 Claims, 14 Drawing Sheets

(56) References Cited

U.S. PATENT DOCUMENTS

| | | | |
|---|---|---|---|
| 7,250,951 B1 | 7/2007 | Hurley et al. | |
| 7,352,371 B2 * | 4/2008 | Gallivan | 345/440 |
| 7,587,681 B2 * | 9/2009 | Kake et al. | 715/805 |
| 2001/0011242 A1 | 8/2001 | Allex et al. | |
| 2003/0182246 A1 * | 9/2003 | Johnson et al. | 705/76 |
| 2004/0268268 A1 * | 12/2004 | Scheu et al. | 715/835 |
| 2006/0093222 A1 * | 5/2006 | Saffer et al. | 382/224 |
| 2007/0019884 A1 * | 1/2007 | Jojic et al. | 382/284 |
| 2008/0307369 A1 | 12/2008 | Liu et al. | |
| 2009/0150775 A1 * | 6/2009 | Miyazaki et al. | 715/702 |
| 2009/0319931 A1 | 12/2009 | Hutchings et al. | |
| 2010/0325166 A1 * | 12/2010 | Rubin et al. | 707/802 |
| 2011/0148909 A1 * | 6/2011 | Besley | 345/592 |

OTHER PUBLICATIONS

Tree Drawing: Sunburst Diagram, obtained at http://animatroid.wordpress.com/2008/08/03/sunburst-an-effective-information-visualization/; Sep. 16, 2010; 4 pages.

Webber, Richard, et al., "Space-filling Techniques in Visualizing Output from Computer Based Economic Models", obtained at http://ideas.repec.org/p/sce/scecfa/67.html; Jul. 4, 2006; 2 pages.

Visualization of Semantic Knowledge Based on an Improved Sunburst Visualization Metaphor; obtained at http://en.scientificcommons.org/59417712; Sep. 16, 2010; 1 page.

* cited by examiner

GALAXY VIEWS FOR VISUALIZING LARGE NUMBERS OF NODES

CROSS REFERENCES TO RELATED APPLICATIONS

This application is related to the following application, U.S. patent application Ser. No. 13/761,614, entitled VISUAL DATA ANALYSIS FOR LARGE DATA SETS, filed on Feb. 7, 2013, which is hereby incorporated by reference, as if set forth in full in this specification:

BACKGROUND

The present application relates to software and more specifically to user interface designs and methods for graphically displaying and interacting with data and/or concepts.

Software for facilitating information visualization is employed in various demanding applications, including enterprise resource planning, scientific research, digital libraries, data mining, financial data analysis, market studies, manufacturing production control, drug discovery, and so on. Such applications often demand space-efficient illustrative visualizations for clearly illustrating data and accompanying characteristics, patterns, and interrelationships.

Space-efficient and illustrative visualizations are particularly important for depicting large data sets, which may include thousands of nodes. Conventionally, visualizations, such as pie charts, bar charts, line graphs, and so on, used to depict large data sets, exhibit design limitations that necessitate summarizing or grouping the data into aggregated sections or nodes, such as bars of a bar chart.

However, important information and patterns may be contained in hidden granular data represented by an aggregated node. Accordingly, functionality for drilling into aggregated nodes to reveal constituent data is often implemented. However, drilling operations can be relatively inefficient and time consuming. Furthermore, drilling into an aggregated node to illustrate more detailed or granular data may not readily reveal potentially important patterns or differences between granular data of adjacent aggregated nodes.

Hence, conventional visualizations and accompanying methods typically lack efficient mechanisms for graphically depicting granular information for large data sets.

SUMMARY

An example method for illustrating data includes accessing data; organizing the data into objects; associating a transparency value with each object; and graphically depicting the data by distributing representations of the objects, called nodes, in a region of a visualization in accordance with a distribution function. Each node appears partially transparent to a degree specified by the transparency value.

In a more specific embodiment, the visualization includes a galaxy visualization characterized by nodes positioned about a center point or region of the galaxy visualization. Polar coordinates are used by the distribution function to characterize positions of one or more nodes of the galaxy visualization. Accordingly, each position of a node is characterized by a radial coordinate and an angular coordinate.

In an illustrative embodiment, the method further includes encoding a variable corresponding to a radial coordinate of a node with a first attribute characterizing the data. The first attribute may include, for example, a position level in an enterprise organizational hierarchy, such that a first node characterized by higher position in the hierarchy than a second node is positioned closer to the center point of the galaxy visualization than the second node.

The method may further include encoding a variable corresponding to an angular coordinate of a node with a second attribute characterizing the data. The second attribute may include, for example, a category of a node. For example, nodes corresponding to enterprise personnel may be categorized by enterprise department. In this embodiment, one or more nodes of a first category are distributed in a first sector of the galaxy visualization, and one or more nodes of a second category are distributed in a second sector of the galaxy visualization.

The method may further include providing a user option to adjust the transparency value. The transparency of each node is adjusted according to the adjusted transparency value. Nodes may be further visually encoded in accordance with a third attribute. The visual encoding may include adjusting a size of a node based on the third attribute. The first, second, and/or third attributes may be similar, thereby resulting in redundant encoding for visual emphasis. Additional attributes may be encoded by adjusting node shape, outline, transparency, and so on.

The method may further include providing a user option to filter the data in accordance with a filtering criterion, thereby selectively changing the number of displayed nodes. Furthermore, categorized nodes may be randomly or pseudo-randomly distributed in rings, sectors, or other regions of a visualization. Node positioning may be randomized based on radial coordinate values and/or angular coordinate values associated with node positions. User options for adjusting ring separation are also provided.

Hence, certain embodiments discussed herein facilitate efficiently illustrating data characterized by thousands of objects, in part by employing partially transparent nodes, which are distributed about a center point a galaxy visualization, to graphically depict the objects. Accordingly, when nodes overlap, quantity information and density information may remain visible, whereas conventionally, overlapping opaque nodes typically conceal visual information pertaining to underlying nodes.

Furthermore, distributing the nodes in the galaxy visualization, such as via a randomization algorithm, may yield particularly illustrative visualizations that may reveal previously unseen data patterns and information. Options for encoding additional information, e.g., via node color, shape, size, outline, positioning, and so on, may further facilitate accentuating patterns, relationships, and other information, which may have otherwise been hidden among granular data of large data sets.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, and so on.

A galaxy visualization, also simply called a galaxy herein, may be any visualization that is characterized by data points, nodes, or other graphical representations of objects or data that are distributed in a region about a point or other reference location or region. In various example embodiments discussed herein, the data is distributed in polar coordinates about a central location (called the center point or pole of the visualization) via a random variable, such as a Gaussian Random Variable (GRV). Accordingly, data positioning may be based on a randomized or partially randomized angle (relative to an arbitrary polar axis extending from a center point of the galaxy visualization) and/or a randomized or partially randomized distance (corresponding to a radial coordinate) from the galaxy visualization center point.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via graphical depiction, such as a node of a visualization, a menu item, dialog box, personnel icon, and so on. The graphical depiction of an object may also be called an object, a displayed object, or a node.

Generally, a node may be any graphical representation of an object in a visualization. Note that certain nodes may include sub-nodes, just as an object may include or represent additional objects, i.e., sub-objects.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
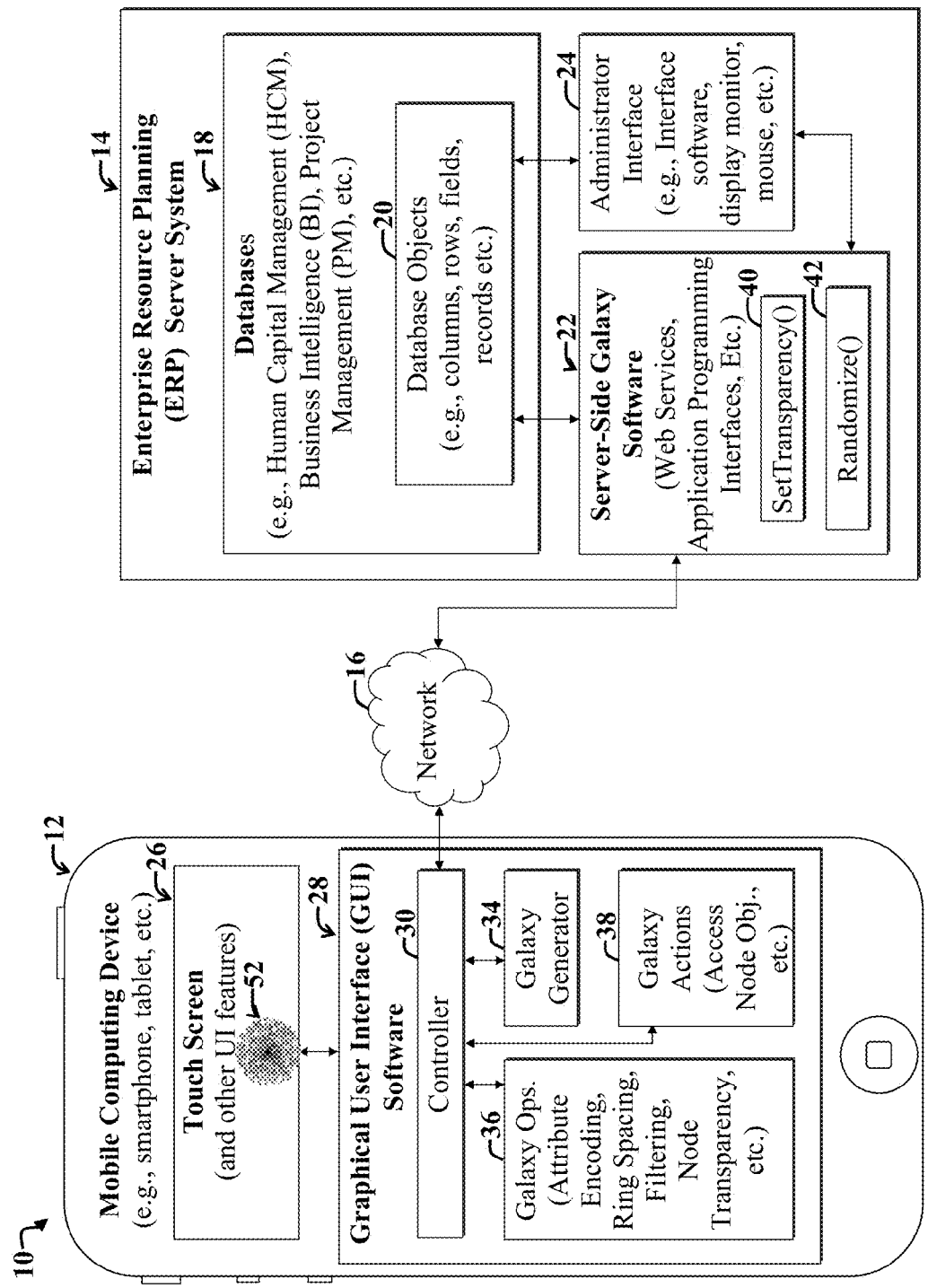
FIG. 1 is a diagram illustrating an example enterprise computing environment and accompanying system for facilitating displaying galaxy visualizations.

FIG. 1 is a diagram illustrating an example enterprise computing environment and accompanying system 10 for facilitating displaying galaxy visualizations, such as a galaxy visualization 52.

The example system 10 includes a mobile computing device 12 in communication with an Enterprise Resource Planning (ERP) server system 14 via a network 16, such as the Internet. The ERP system 14 includes various databases 18, which store database objects 20.

Server-side software 22, such as web services, Application Programming Interfaces (APIs), and so on, may communicate with the database objects 20 to selectively employ data thereby, such as to facilitate implementation of various software applications, which may include server-side and client-side software applications. Generally, server-side implementations involve running applications on the ERP server 14 in response to a request from a client, such as the mobile computing device 12. The server-side application may then send data and/or instructions back to the client device 12. In client-side implementations, software may be downloaded to the mobile computing device 12 and executed locally on the device 12.

The example ERP server system 14 includes an administrator user interface 24, which may include hardware and software functionality for enabling an administrator to make changes to various components of the ERP server system 14, such a settings, installed software, and so on.

The mobile computing device 12 represents an example client device that communicates with server-side galaxy visualization software 22. Note that client devices other than mobile computing devices may be employed without departing from the scope of the present teachings.

The mobile computing device 12 employs a relatively small touch screen 26 in communication with Graphical User Interface (GUI) software 28, which is adapted to facilitate displaying one or more galaxy visualizations 52 via the touch screen 26. The GUI software 28 may be any software application or component, such as a spread sheet program, graphing software, and so on, that is adapted to facilitate displaying graphical user interface features and/or data, such as graphs, menu items, dialog boxes, and so on.

The example GUI software 28 includes a controller 30 in communication with a galaxy generator 34, a galaxy actions module 38, and a galaxy operations module 36. The controller 30 includes computer code for coordinating inputs and outputs to and from the modules 34-38 and interfacing the GUI software 28 and accompanying modules 34-38 with the server-side galaxy visualization software 22.

In an example operative scenario, a user employs the mobile computing device 12 to browse to a website hosted by the ERP server system 14, which provides access to the server-side galaxy visualization software 22 and accompanying database objects 20. The controller 30 may facilitate downloading database objects 20 from the ERP server system 14 and server-side galaxy visualization software 22 for use in constructing a galaxy visualization 52 to be displayed via the touch screen 26.

In the present example operative scenario, the GUI software 28 selectively downloads database objects 20 from the ERP server system 18. The galaxy generator 34 then employs client-side galaxy-generating software to construct one or more galaxy visualizations in accordance with instructions included in the controller 30 and input from the touch screen 26.

Initial or default methods and algorithms for distributing the nodes in a visualization (e.g., randomizing galaxy node positions), determining node transparency, and for encoding any data attributes (e.g., attributes of the database objects 20) via node characteristics (e.g. node size, color, shape, and so on) may be initially determined by the GUI software 28.

The controller 30 may facilitate implementing GUI components and user interface controls to provide user options to adjust galaxy attribute encoding, as discussed more fully below. Alternatively, or in addition, galaxy attributes (i.e., attributes of data used to generate a galaxy visualization) are automatically encoded, such as in accordance with space constraints inherent in a display; numbers of nodes to be illustrated, and so on.

For the purposes of the present discussion, an attribute of a visualization, node, or associated data, may be any characteristic of data used to generate a visualization, where the characteristic may be employed to group or otherwise organize or visually distinguish the data by adjusting features or characteristics of the visualization. Examples of attributes include data dimensions or layers, such as specified by table headers of tables used to store the data used for a visualization.

Visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node in a visualization, the hierarchical position is said to be visually encoded via the node size, shape, color, or position, respectively.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Touch input may be any input, such as input via a gesture, provided to a computing device via a touch-sensitive display. A gesture may be any movement that involves motion to trigger a signal to control or otherwise affect a user interface display screen.

Key functionality for adjusting displayed characteristics of a galaxy visualization may be included in various functions (e.g., a SetTransparency( ) 40 and Randomize( ) function 42) of the server-side galaxy visualization software API 22. The functions 40, 42 may be called remotely via the galaxy generator 34 and controller 30 as needed in response to certain user input, or automatically in accordance with instructions included in the controller 30. Alternatively, the functions 40, 42 may be downloaded to the mobile computing device 12 and run client-side.

The Randomize( ) function 42 of the server-side galaxy software 22 may employ a software random number generator to implement a distribution function or method to distribute nodes in a galaxy visualization, such as the galaxy visualization 52, or portion thereof. A position of a node may be randomized by using a random number generator to facilitate generating random numbers, subject to certain range constraints, for use as radial coordinates or angular coordinates of a node position, which is specified via polar coordinates.

A random number generator may employ a software representation of a random variable, such as a Gaussian, Poisson, Uniform, Bernoulli, Binomial, or other random or pseudorandom variable to generate approximately random numbers as output. A pseudorandom variable may output pseudorandom numbers, which are not purely random. Those skilled in the art may readily determine and implement algorithms to implement sufficiently random number outputs to distribute nodes to meet the needs of a given implementation without undue experimentation and without departing from the scope of the present teachings.

The Randomize( ) function 42 is said to implement a distribution function or portion thereof. For the purposes of the present discussion, a distribution function may be any equation, formula, rule, algorithm, or method used to spread or distribute data or data representations linearly, spatially, or volumetrically.

Certain embodiments discussed herein employ a random or pseudo random distribution function to randomly distribute data in one or more rings of a galaxy visualization. Such distribution of nodes is called node position randomization herein. As suggested above, such a distribution function may employ a random or pseudorandom variable to distribute data within a predetermined region of a galaxy visualization. A collection of nodes, whose positions are specified via polar coordinates or spherical coordinates, are said to be randomly distributed in a galaxy visualization if a random viable or pseudo random variable is used to determine or otherwise affect node positioning.

In certain implementations, one or more node position coordinates are randomized. In cases where one node coordinate, e.g., a radial coordinate or angular coordinate is randomized, the remaining coordinate may be encoded with information characterizing the data. In these cases, the node positioning is still said to be randomized.

Furthermore, in certain cases, a radial coordinate of a set of nodes may be limited between an upper limit and a lower limit, e.g., corresponding to an inner ring boundary and an outer ring boundary respectively. A random variable may then be employed to distribute the set of nodes randomly within the radial coordinate range.

Similarly, in certain implementations, an angular coordinate of a set of nodes may be limited by upper and lower limits, e.g., corresponding to opposing edges of a sector. A random variable may be employed to adjust the angular coordinate and radial coordinate to randomly distribute the nodes within the region defined by the sector boundaries.

In practice, a software random number generator, such as represented via the Randomize( ) function 42 may be employed to determine random values within a given range to facilitate randomizing node positioning subject to the range constraints. Note that use of random number generators may result in pseudorandom distributions, since random number generator output is typically not completely random.

Those skilled in the art will appreciate that distribution methods other than randomization may be employed without departing from the scope of the present teachings. For example, in certain implementations, nodes may be evenly distributed within a ring or sector, whereas other nodes or sectors of the same galaxy visualization may be characterized by different distributions, without departing from the scope of the present teachings.

The exact type and details of the distribution algorithms used to distributed nodes within a given region of a galaxy visualization may vary among visualizations and within a given visualization, without departing from the scope of the present teachings. For example, variations in distribution methods applied within different regions of a given galaxy visualization may be employed to encode additional information (not already encoded in characteristics of the galaxy visualization) or redundant information. For example, in certain galaxy visualizations used to display enterprise organizational hierarchy information, nodes corresponding to enterprise management personnel may be evenly distributed in one or more central rings, whereas the remaining enterprise personal may be randomly distributed in an outer ring of the galaxy visualization.

Note that while the example GUI software 28 is shown included in the mobile computing device 12, implementations are not limited thereto. For example, the GUI software 28 may be incorporated into the server-side galaxy visualization software 22 and run on the server 14 as a server-side application. The server side application may be run server-side and viewed client-side via browser software running on the mobile computing device 12.

In the present example embodiment, various GUI modules 34-38 include computer code for implementing functionality for adjusting how a galaxy visualization is displayed via the touch screen 26. Example galaxy operations, which may be implemented in part via the galaxy operations module 36, include adjusting attribute encoding, adjusting ring spacing, performing filtering operations, adjusting transparency, and so on. Example galaxy actions 38 include triggering display of additional details of a data object represented via a node of the galaxy visualization 52 in response to certain user input (such as a tap gesture applied to a displayed ring or node), and so on, as discussed more fully below with reference to FIG. 2.

Figure 2:
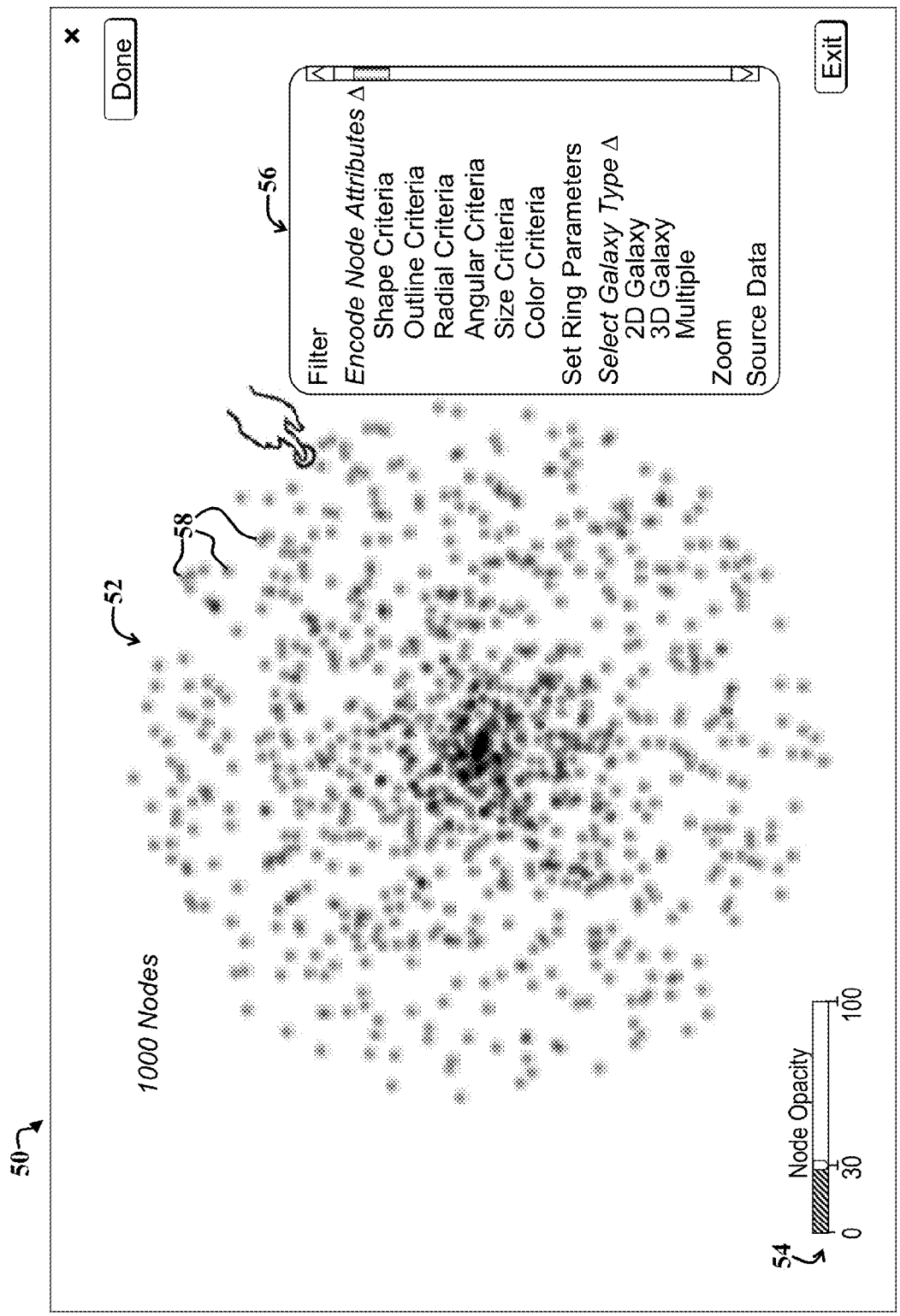
FIG. 2 shows a first example user interface display screen illustrating a first galaxy visualization, a slider bar for adjusting node transparency, and a drop-down menu with various user options for modifying the galaxy visualization.

FIG. 2 shows a first example user interface display screen 50, which may be displayed via the touch screen 26 of FIG. 1. The user interface display screen 50 illustrates a first galaxy visualization 52 (illustrating approximately 1000 nodes) and includes a node transparency slider bar user interface control 54, also simply called a slider, for adjusting transparency of nodes 58 of the galaxy visualization 52.

For the purposes of the present discussion, a slider user interface control may be any user interface control with a graphic that can be positioned or moved to change values or factors corresponding to positions of the graphic. A slider bar may be any movable graphic of a slider user interface control.

Currently, the node transparency slider 54, which may also be called an opacity slider, is set at approximately 30%, which may correspond to an alpha value of 0.3 when alpha composting methods are employed to set transparency. The 30% setting specifies that nodes are approximately 30% opaque, where a setting of 0% would result in completely transparent nodes, and where a setting of 100% would result in completely opaque nodes.

Note that where multiple nodes overlap, the overlapping region becomes progressively darker as more nodes overlap each other. Accordingly, a center of the visualization 52 appears darker, since more nodes overlap near the center of the visualization 52. More nodes overlap near the center of the visualization 52, since, in the present example embodiment, node positions have been distributed pseudo randomly by randomizing both the node radial position coordinate and the node angular position coordinate for each node.

Since less area exists near the center of the visualization 52 to accommodate nodes, some nodes overlap near the center of the visualization 52. Note that in certain implementations, where few nodes are displayed, and nominal node size is relatively small relative to a maximum radial value set for a visualization, overlap may not necessarily occur near the center point of the visualization.

Nevertheless, the degree to which the overlap between nodes varies from the center of a galaxy visualization may facilitate visually illustrating and enabling effective comparisons between quantities of nodes illustrated by such galaxy visualizations, as discussed more fully below with reference to FIGS. 3, 4, and 13. Furthermore, such variation in node density with radial distance from the center of a galaxy visualization may facilitate enabling viewers to ascertain quantity information from very large data sets, even when employing very small galaxy visualizations, as discussed more fully below with reference to FIG. 13.

A drop-down menu 56 may appear in response to a gesture, such as a tap and hold gesture, applied to a region of the touch screen 26 of FIG. 1 coinciding with the galaxy visualization 52. The drop-down menu 56 includes various user options for modifying the galaxy visualization 52. Example user options include a user option to implement filtering operations, user options to encode node attributes, a user option to set galaxy visualization ring parameters, user options to switch between types of displayed galaxy visualizations, a user option to zoom in or out on the galaxy visualization 52, and a user option to change, adjust, or configure source data used to generate the galaxy visualization 52.

Examples of user options to encode node attributes of the galaxy visualization 52 include an option to adjust node shape based on a specified shape criteria, a user option to adjust node outline appearance based on a specified outline criteria, a user option to adjust node radial position from a galaxy visualization center point based on a specified radial criteria, a user option to adjust node size based on a specified node size criteria, and a user option to adjust node color (or other visual characteristics, e.g., node shading) based on a specified node color criteria. Specifying the criteria for the various user options effectively involves encoding data attributes based on node size, color, outline appearance, etc.

Examples of user options for switching between types of displayed galaxy visualizations include a user option to display a two-dimensional galaxy visualization, a user option to display a three-dimensional galaxy visualization, and a user option to display multiple galaxy visualizations. Note that a three-dimensional galaxy visualization may be constructed similarly to a two-dimensional galaxy visualization, but spherical coordinates are employed to distribute nodes in the three-dimensional visualization, and additional user interface controls may enable rotating the three-dimensional visualization.

In general, upon user selection of a user option from the drop-down menu 56, an additional dialog box or user interface display screen may appear with additional user interface controls and input fields and mechanisms to enable users to set criteria, choose additional options, and so on. For example, if a user selects a user option to display multiple galaxy visualizations, an additional user interface display screen may appear with options to specify data categories or source data to be used to generate each displayed visualization.

Note that implementations that provide additional user options other than those shown in the drop-down menu 56 are possible. For example, in certain implementations, it may be possible to select a ring of a galaxy visualization, as discussed more fully below, to activate a menu with a user option to create a new galaxy visualization based on nodes included in the selected ring.

Figure 3:
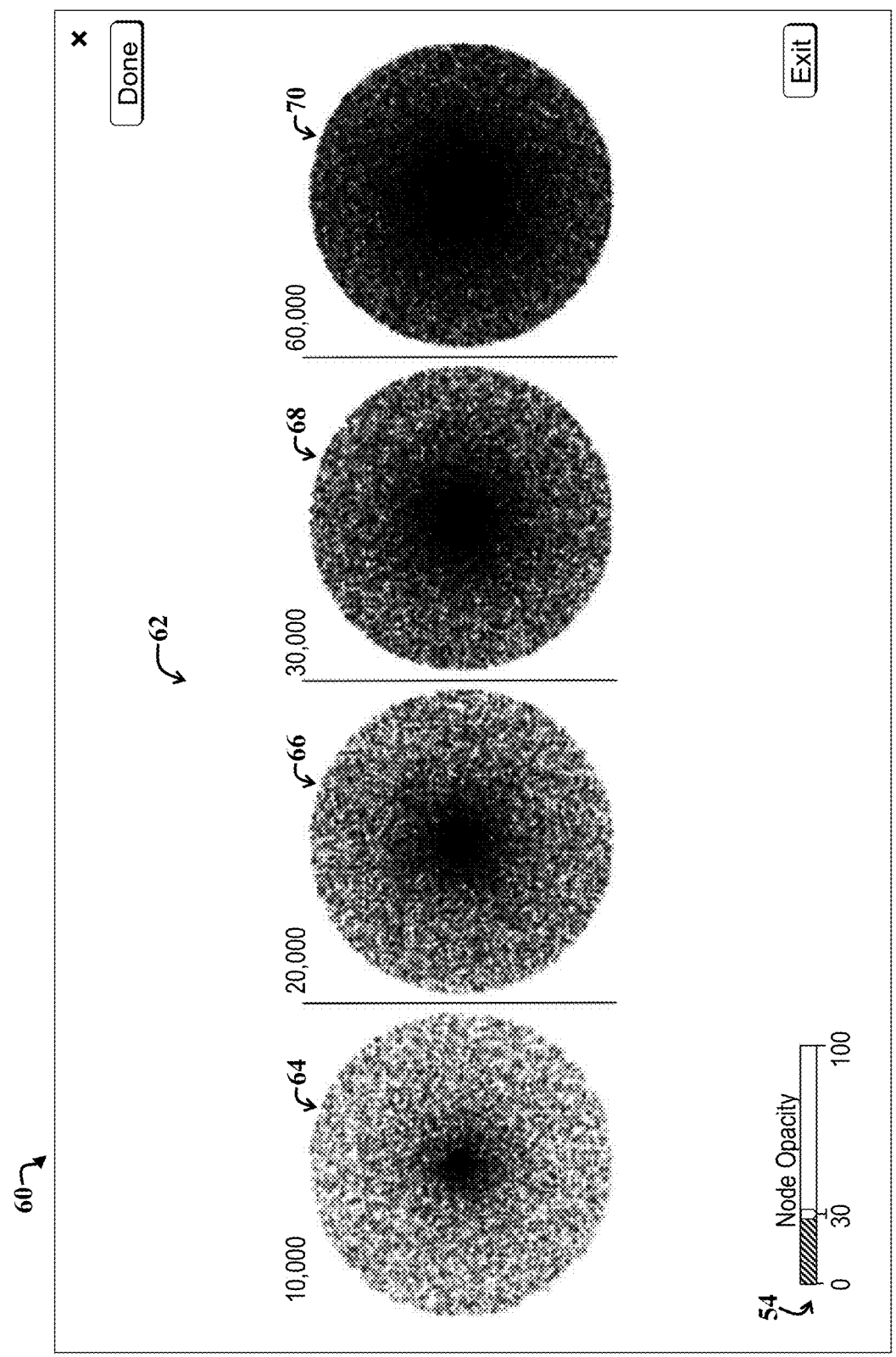
FIG. 3 shows a second example user interface display screen illustrating multiple galaxy visualizations displaying between 10,000 and 60,000 nodes.

FIG. 3 shows a second example user interface display screen 60 illustrating four galaxy visualizations 62 displaying between 10,000 and 60,000 nodes. The node transparency slider 54 simultaneously, i.e., globally, controls node transparencies for all of the galaxy visualizations 62. Note however, that individual node transparency sliders may be provided for each displayed galaxy visualization 64-70, without departing from the scope of the present teachings.

A first galaxy visualization 64 depicts 10,000 nodes randomly distributed about a center point of the galaxy visualization 64, where both radial and angular position coordinates of each node are randomized. The radial position coordinates are randomized between 0 and a maximum predetermined radius established for the galaxy visualization. Angular position coordinates are randomized between 0 degrees and 360 degrees. In the present specific embodiment, polar coordinates of a node identify a position of a centroid of the node.

A second galaxy visualization 66 illustrates 20,000 nodes. A third galaxy visualization 68 illustrates 30,000 nodes, and a fourth galaxy visualization 70 illustrates 60,000 nodes. Simultaneous display of the multiple visualizations 64-70 may be initiated after a user has chosen a Multiple option from the drop-down menu 56 illustrated in FIG. 2 and after a user has specified related configuration information (e.g., via a subsequently displayed configuration screen) indicating parameters for displaying multiple visualizations, including indicating the number of galaxy visualizations to display and source data to be used to generate each galaxy visualization.

Note that with the current node transparency settings (30%) specified via the slider 54, the fourth galaxy visualization 70 has become substantially dark due to substantial numbers of overlapping nodes. Nevertheless, differences in node quantities occurring between each of the galaxy visualizations 64-70 are clearly visually distinguishable.

If for example, with the current transparency settings, each of the galaxy visualizations 64-70 were used to display between 100,000 and 600,000 nodes, then the galaxy visualizations 64-70 could appear virtually indistinguishable. However, such visualizations could be made distinguishable by a simple transparency adjustment via the node transparency slider 54, i.e., by making individual nodes more transparent.

Figure 4:
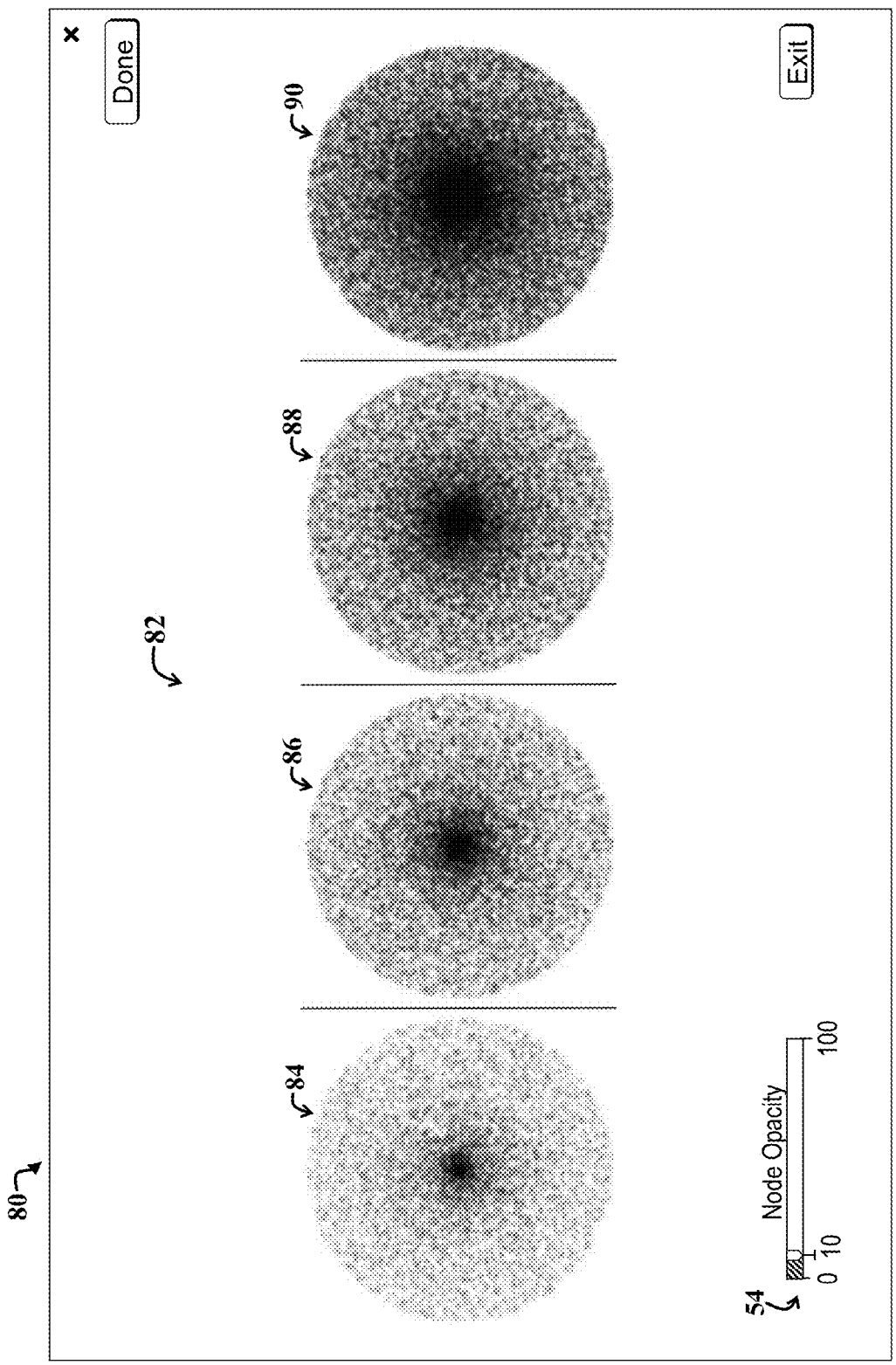
FIG. 4 shows a third example user interface display screen illustrating the galaxy visualization of FIG. 3 after a user has globally reduced node transparency.

FIG. 4 shows a third example user interface display screen 80 illustrating the galaxy visualization 62 of FIG. 3 after a user has reduced node transparency, resulting in updated galaxy visualizations 82 with nodes that are more transparent than their counterparts 62 of FIG. 3.

Adjustments to node transparencies may be implemented via various implementation specific methods and may vary without departing from the scope of the present teachings. In the present specific embodiment, node transparency adjustments are implemented via alpha compositing, which involves selectively combining an image of a node with background information to create the appearance of partial or full transparency. The background information may include information pertaining to the numbers of nodes overlapping at a given position of the user interface display screen 80.

Increasing node transparency, e.g., by adjusting the slider 54 to the left, is shown (with reference to FIGS. 3 and 4) to affect appearance of variations in node density with radial distance from center points of each galaxy visualization 84-90. In particular, note that the less opaque visualization 90 of FIG. 4 more clearly illustrates node density variation with distance from a center point of the galaxy visualization 90 as compared to the substantially opaque galaxy visualization 70 of FIG. 3. Accordingly, by enabling adjustments to node transparency, arbitrarily large numbers of nodes may be illustrated in a given galaxy visualization while still illustrating node quantity information associated therewith.

Figure 5:
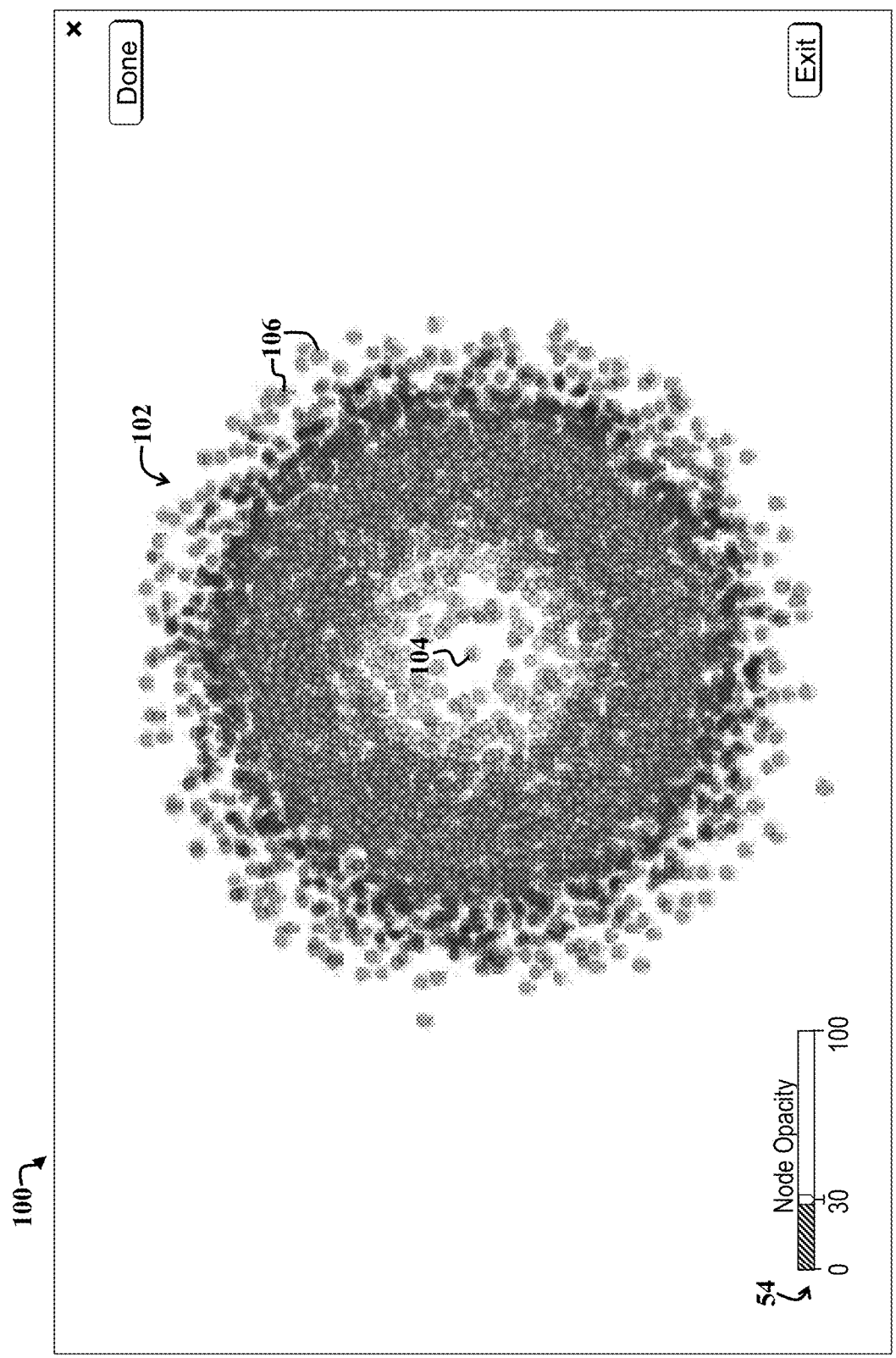
FIG. 5 shows a fourth example user interface display screen illustrating an example color coded and radially coded galaxy visualization representing a first enterprise organizational hierarchy.

FIG. 5 shows a fourth example user interface display screen 100 illustrating an example color coded and radially coded galaxy visualization 102 representing a first enterprise organizational hierarchy, also simply called an enterprise hierarchy herein. The galaxy visualization 102 represents a type of hierarchy visualization.

For the purposes of the present discussion, a hierarchy visualization may be any visualization that is adapted to illustrate a hierarchy or hierarchal relationship between data or data objects. A hierarchy may be any ordering of or arrangement of data, where different data in the arrangement may exhibit superior or subordinate relationships with other data. A hierarchy may refer to a displayed representation of data objects or may refer to data and accompanying relationships existing irrespective of the representation. For example, an enterprise hierarchy, e.g., which may be displayed via an organizational chart (also called org chart) may be any power structure, position structure, or reporting structure characterizing an enterprise.

Nodes of the visualization 102 are both color coded and radially coded to illustrate enterprise hierarchy information. Hierarchy information is said to represent a node attribute that is redundantly encoded via two node characteristics, namely node radial distance from a center point or region of a galaxy visualization (i.e., radial coordinate) and node color. Redundant encoding of an attribute via different node characteristics may enhance or emphasize appearance of the attribute information in a galaxy visualization.

In the present specific embodiment, nodes of the visualization 102 represent or correspond to enterprise personnel. Nodes of the visualization 102 are organized such that nodes corresponding to higher level personnel, e.g., management personnel, are positioned closer to the center point of the visualization 102, and lower level personnel are positioned further from the center point based on organizational hierarchy levels. Each organizational hierarchy level is assigned a different color, such that nodes associated with enterprise personnel at different hierarchy levels exhibit different corresponding colors.

Hence, nodes near the center of the visualization 102 represent upper level management personnel, which exhibit a different color than nodes enterprise personnel of other levels. For example, in the galaxy visualization 102, a central node 104 may be colored red and may correspond to a Chief Executive Officer (CEO) or president, whereas outer nodes 16 may be colored a different color, such as violet, and may represent the lowest level enterprise employees of the visualization 102. Note that variations in node appearance other than color may be employed to encode information, i.e., attributes pertaining to underlying data. For example, variations in node shading, cross-hatching, shapes, outlines, and so on may be employed to implement visual encoding of data attributes.

Galaxy visualizations can be particularly effective at displaying hierarchal information. Hierarchies often contain fewer nodes at upper hierarchy levels which may be displayed near a center region of a galaxy visualization, where less space for displaying non-overlapping nodes exists. Any additional space that may exist near a center of a galaxy visualization may be utilized, e.g., by increasing node sizes in accordance with hierarchy levels, thereby further applying additional redundant encoding to enhance visual emphasis of hierarchy information illustrated via the galaxy visualization 102, as discussed more fully below with reference to FIG. 6.

Figure 6:
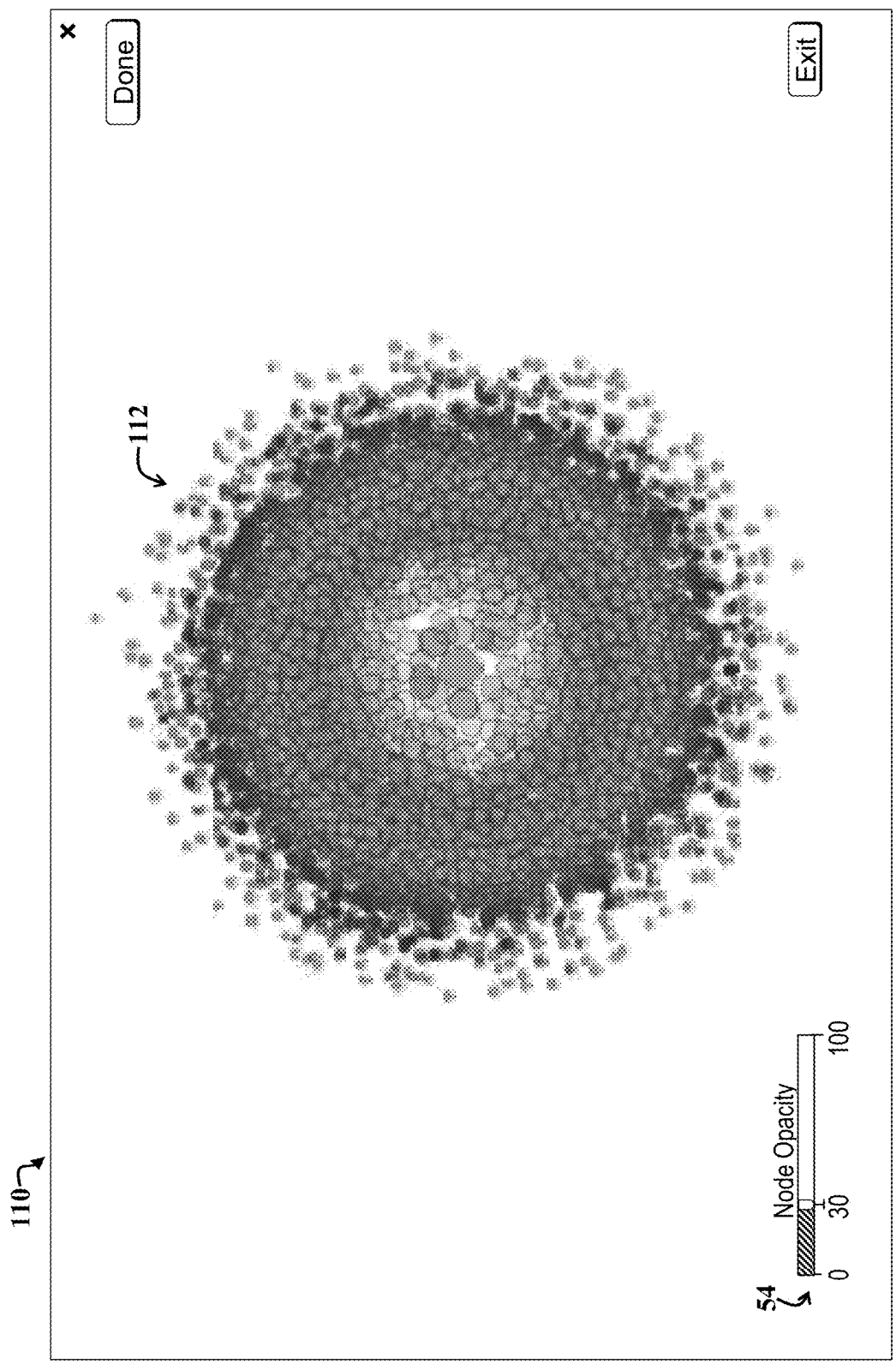
FIG. 6 shows a fifth example user interface display screen illustrating the galaxy visualization of FIG. 5 after a user has implemented, for emphasis, redundant node size encoding to encode enterprise organizational hierarchy information.

FIG. 6 shows a fifth example user interface display screen 110 illustrating the galaxy visualization 102 of FIG. 5 after a user has implemented encoding of enterprise hierarchy levels in accordance with node size, resulting in a first updated galaxy visualization 112. For visual emphasis, redundant node size encoding is employed to encode enterprise hierarchy levels. Nodes corresponding to progressively lower ranked enterprise personnel are shown as progressively smaller. For example, more centralized nodes, e.g., corresponding to upper level enterprise management personnel may be made larger than other nodes, thereby symbolically reflecting their hierarchy level or importance level in an organization.

The galaxy visualization 112 may represent an entire enterprise hierarchy or a hierarchy of a particular division, location, or region. Note that implementations are not limited to displaying hierarchy information, such as enterprise hierarchy information. In general, any data set that can be separated into different objects, e.g., data elements, corresponding to nodes, which can be illustrated via a galaxy visualization in accordance with the present teachings, without departing from the scope thereof.

Figure 7:
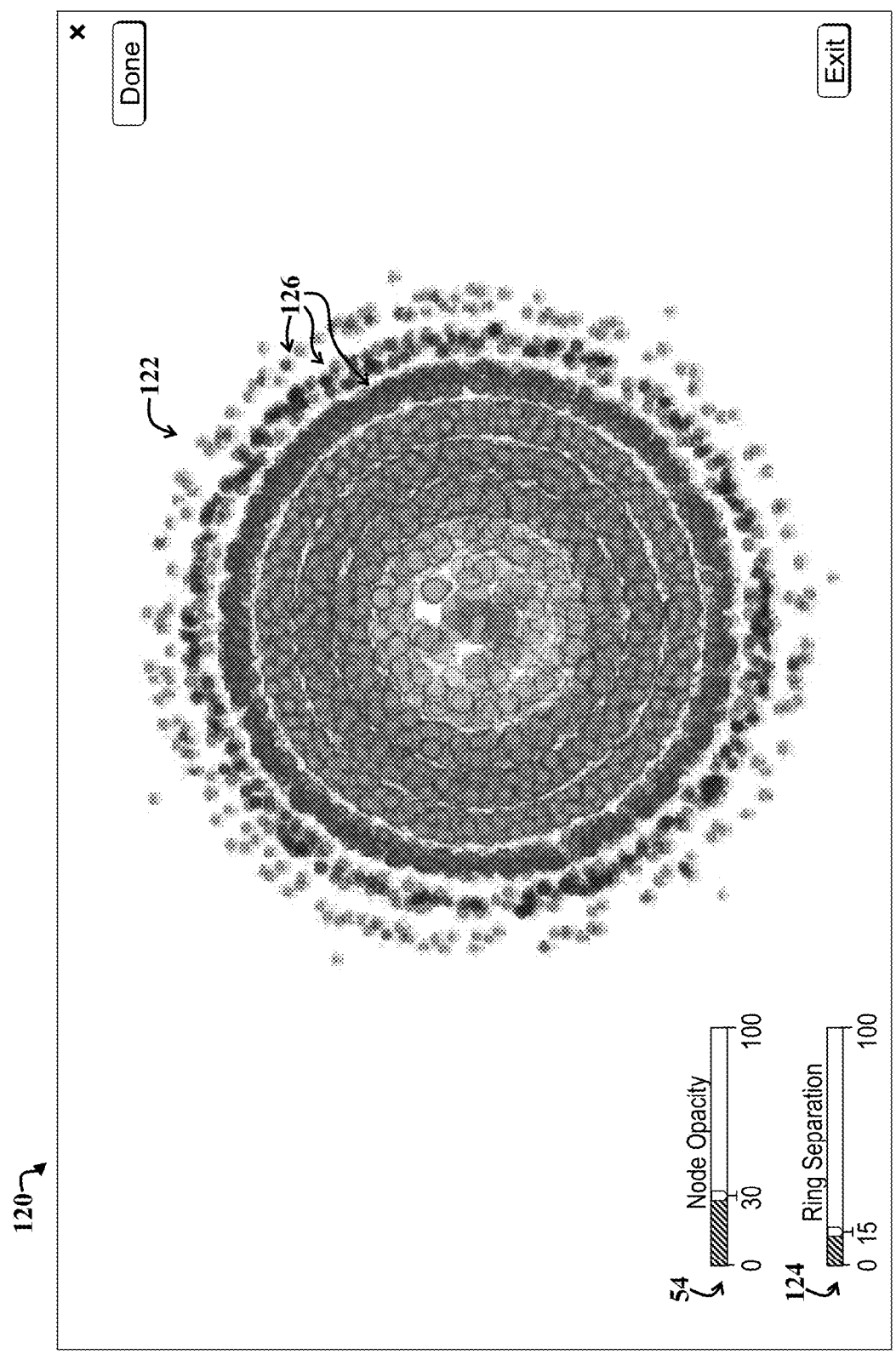
FIG. 7 shows a sixth example user interface display screen illustrating the galaxy visualization of FIG. 6 after a user has increased galaxy separation between rings representing enterprise organizational hierarchy levels.

FIG. 7 shows a sixth example user interface display screen 120 illustrating the galaxy visualization 112 of FIG. 6 after a user has increased galaxy ring separation, resulting in a ringed galaxy visualization 122. In the present specific embodiment, different rings 126 of the galaxy visualization 122 exhibit different colors and represent different enterprise hierarchy levels. Hence, hierarchy information is encoded via node positioning, node color, and node size.

For the purposes of the present discussion, a ring may be any band that subtends a predetermined angle about a central point or region. A fully closed ring subtends a 360-degree angle. A sector may be any portion of a ring. Hence, a sector may be a particular type of ring, which may subtend an angle less than 360 degrees. In a special case where a closed ring comprises a single sector, the sector represents a fully closed ring. A ring need not necessarily be hollow. For example, an inner ring may be a solid circle or other shape. Similarly, a ring need not necessarily have a circular outline. For example, ovals or other form factors are possible.

The width of each ring 126 and the spacing between rings may be user selectable, e.g., via one or more user options chosen from the drop-down menu 56 of FIG. 2. For example, user selection of a Set Ring Parameters user option from the drop-down menu 56 of FIG. 2 may result in display of a ring separation slider 124, which is user adjustable to change ring separation. Note that additional mechanisms for adjusting additional ring or galaxy visualization parameters may be provided, such as a user option to adjust an outer radius boundary of a galaxy visualization and a user option to adjust ring width.

Alternatively, galaxy visualization maximum size and/or individual ring width may be automatically set via an implementation specific algorithm based on node density within a given ring and/or based on other factors, such as attribute encoding, and so on. For example, certain galaxy visualization data attributes may be encoded in ring width and/or ring separation, without departing from the scope of the present teachings.

Node positioning within a given ring is distributed, e.g., randomized, by applying a distribution function to a radial coordinate, subject to range constraints corresponding to an inner ring boundary and an outer ring boundary, and by applying a distribution function to an angular coordinate. Note that the boundaries of a central ring may be made sufficiently narrow to cause the center node, e.g., corresponding to a CEO, to be approximately centered at the center point of the galaxy visualization 122.

Figure 8:
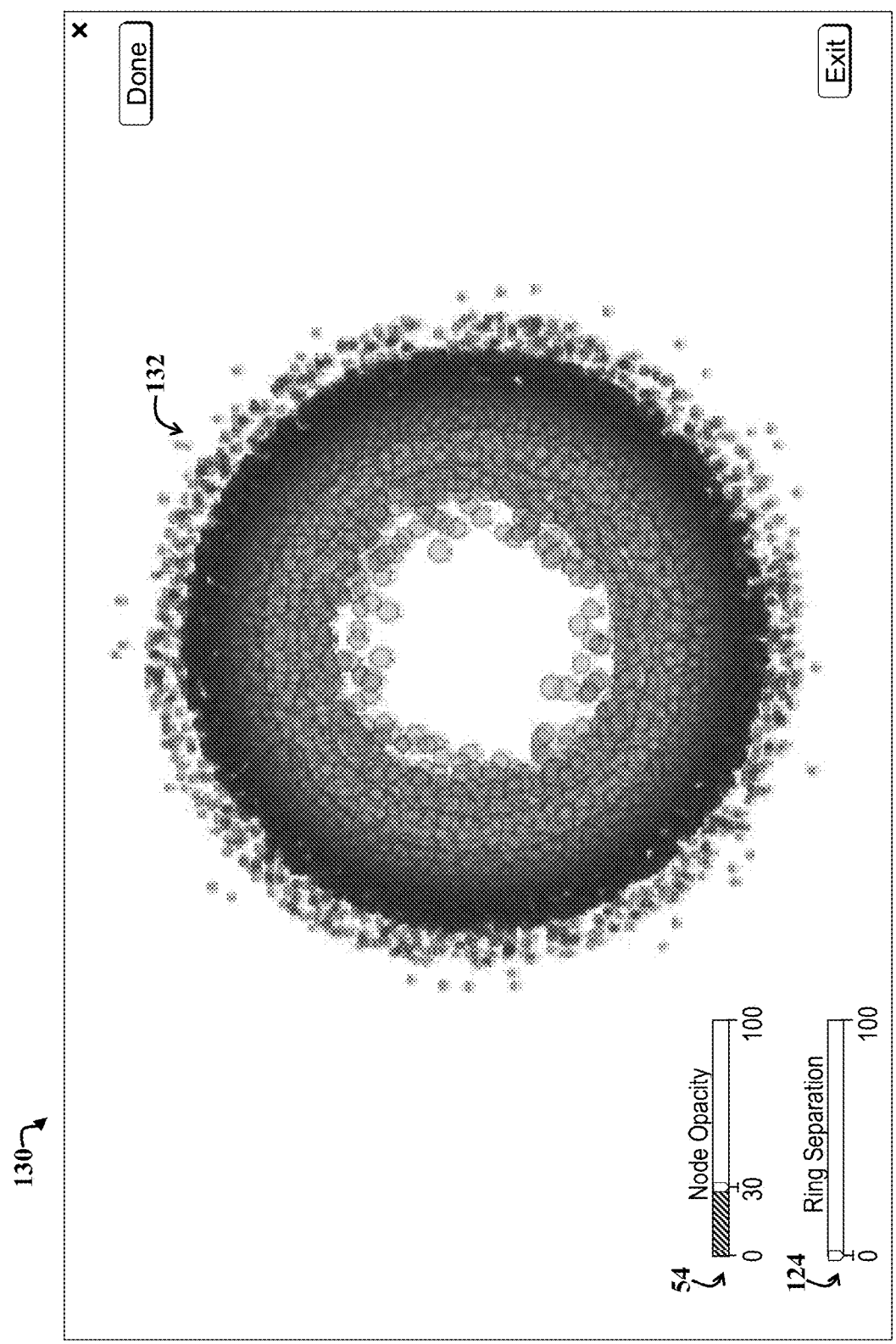
FIG. 8 shows a seventh example user interface display screen illustrating an example color coded, radially coded, and node-size coded galaxy visualization representing a second enterprise organizational hierarchy.

FIG. 8 shows a seventh example user interface display screen 130 illustrating an example color coded, radially coded, and node-size coded galaxy visualization 132 representing a second enterprise hierarchy. In the present specific embodiment, the hierarchy represented via the galaxy visualization 132 depicts an enterprise hierarchy at a location that lacks upper level management, but includes substantial numbers of mid-level personnel, as reflected by a lack of centralized nodes.

Figure 9:
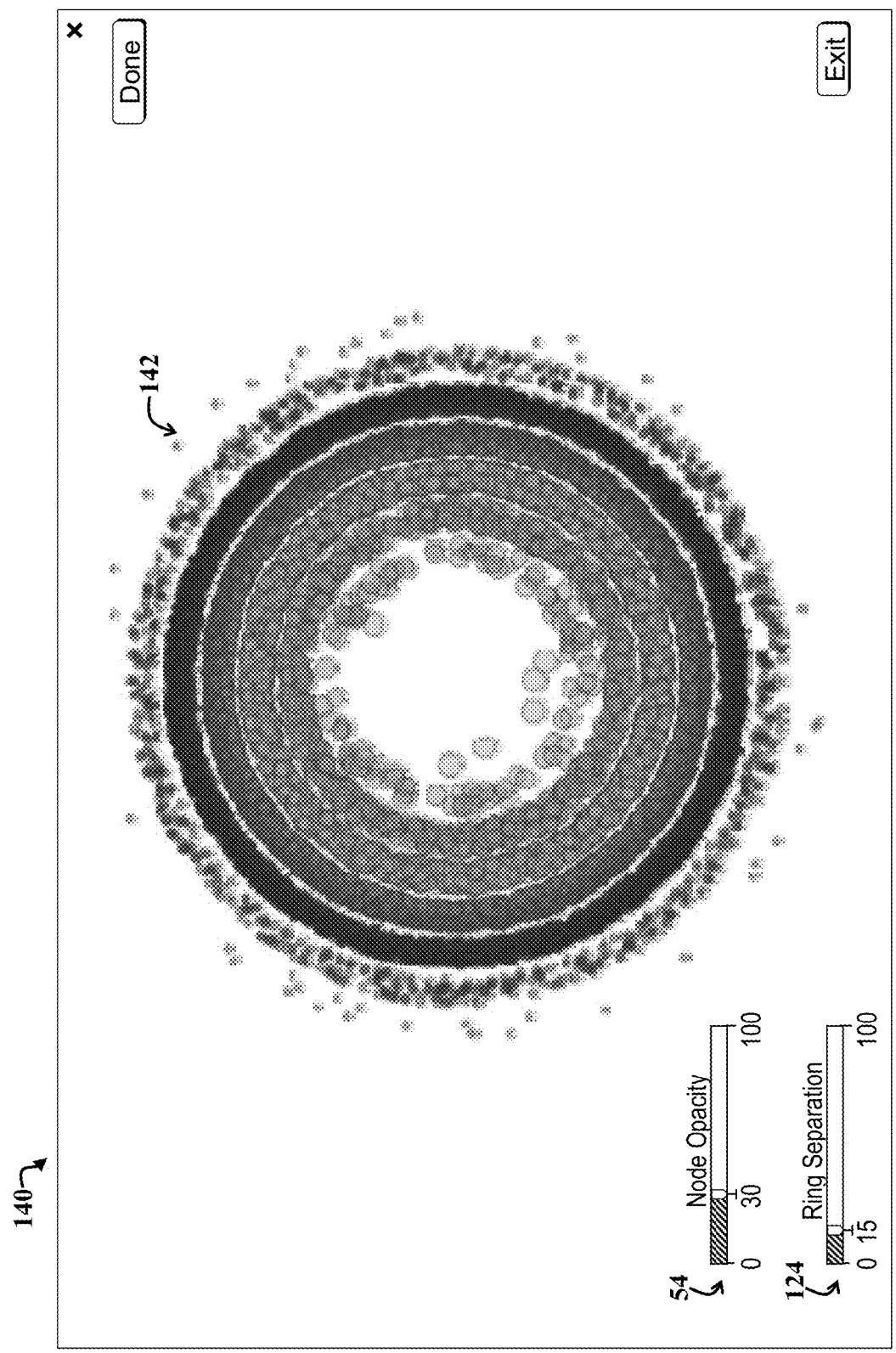
FIG. 9 shows an eighth example user interface display screen illustrating the galaxy visualization of FIG. 8 after a user has increased galaxy ring separation.

FIG. 9 shows an eighth example user interface display screen 140 illustrating the galaxy visualization 132 of FIG. 8 after a user has increased galaxy ring separation, resulting in an updated ringed galaxy visualization 142. Note that user options for adjusting overlap between rings may be provided in certain implementations.

Figure 10:
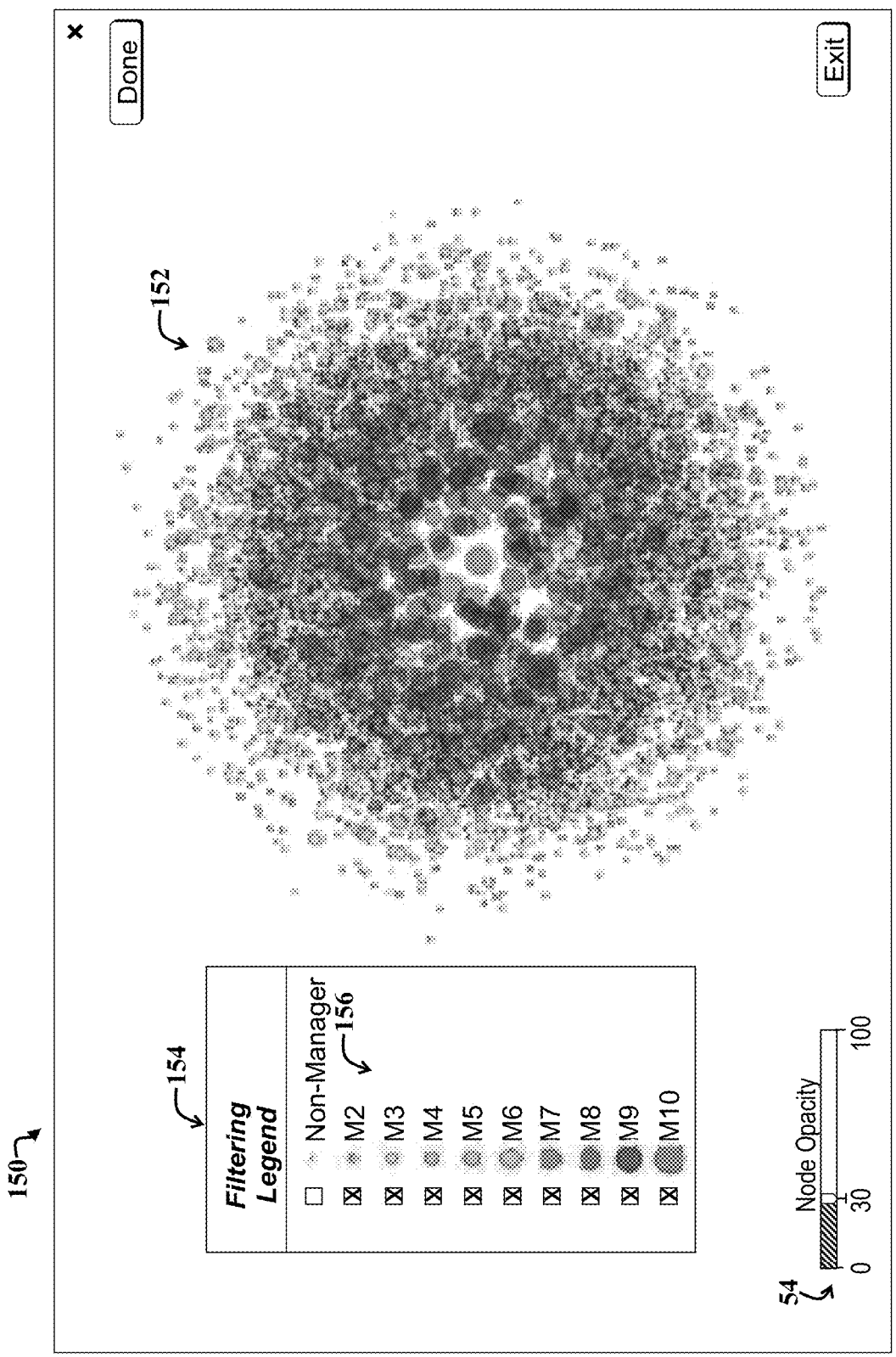
FIG. 10 shows a ninth example user interface display screen illustrating the galaxy visualization of FIG. 5 after a user has implemented a first example filtering operation.

FIG. 10 shows a ninth example user interface display screen 150 illustrating the galaxy visualization 102 of FIG. 5 after a user has implemented a first example filtering operation, resulting in an updated filtered galaxy visualization 152. The user interface display screen 150 includes a filtering legend 154, with user options, e.g., check boxes, for selecting which hierarchy categories 156 to represent via the visualization 152. The selectable hierarchy categories 156 correspond to management levels (i.e., Non-Manager, and management levels M1-M10).

The filtering legend 154 may appear in response to user selection of a filter option from the drop-down menu 56 of FIG. 2. In the present specific embodiment, a user has selected to display all management level personnel, by selecting management levels M2-M10 in the filtering legend 154.

Figure 11:
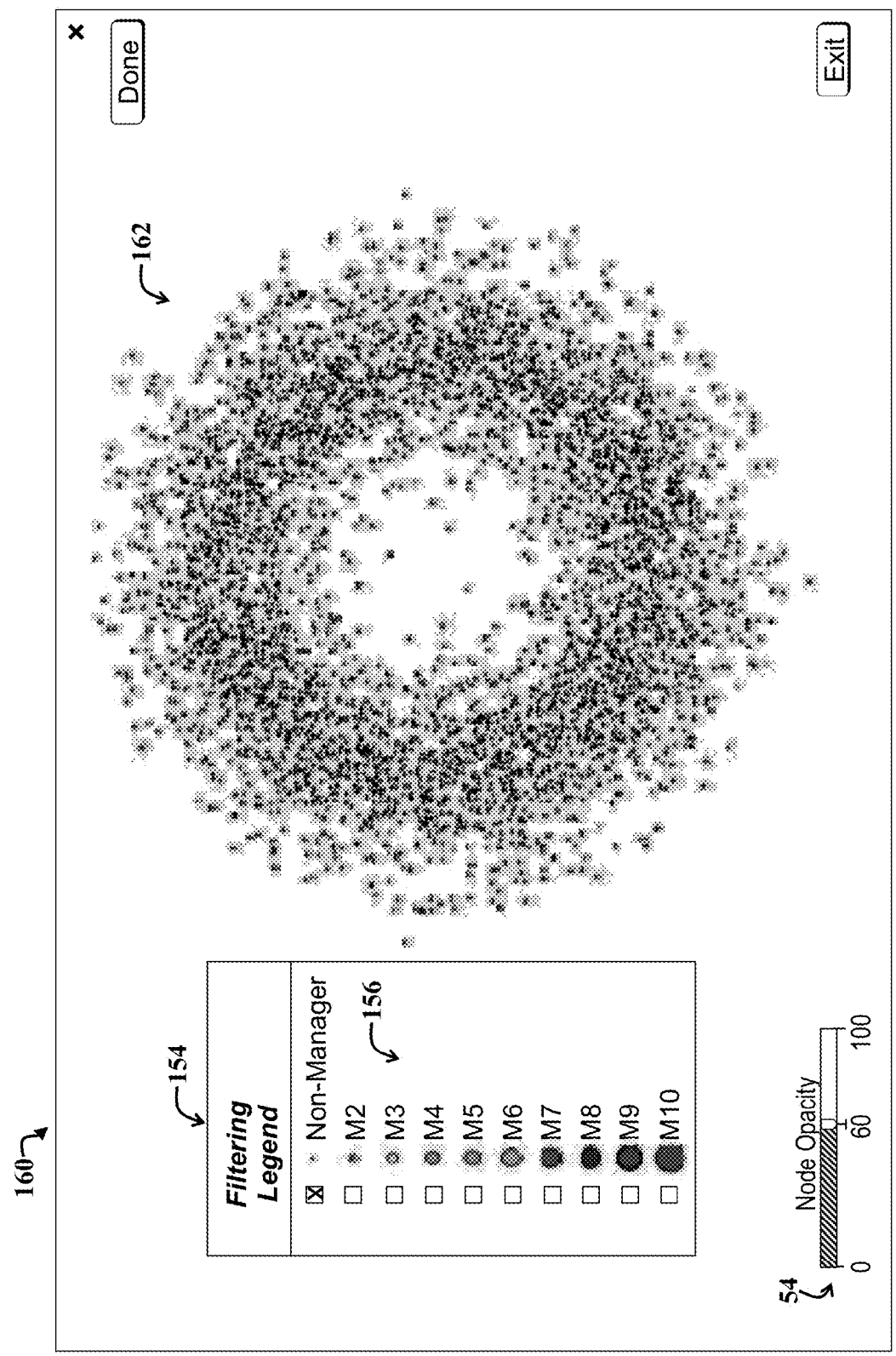
FIG. 11 shows a tenth example user interface display screen illustrating the galaxy visualization of FIG. 9 after a user has implemented a second example filtering operation and has further adjusted node transparency.

FIG. 11 shows a tenth example user interface display screen 160 illustrating the galaxy visualization 152 of FIG. 9 after a user has implemented a second example filtering operation and has further adjusted node transparency, resulting in an updated filtered galaxy visualization 162.

During the second filtering operation, a user has employed the filtering legend 154 to display only nodes corresponding to non-management-level personnel in the visualization 162. Since node size was used to encode hierarchy information, non-manager nodes appear relatively small and are spatially well dispersed. Accordingly, a user has employed the transparency slider 54 to increase node opacity, e.g., to 60% to enhance the appearance of individual nodes in the galaxy visualization 162.

Figure 12:
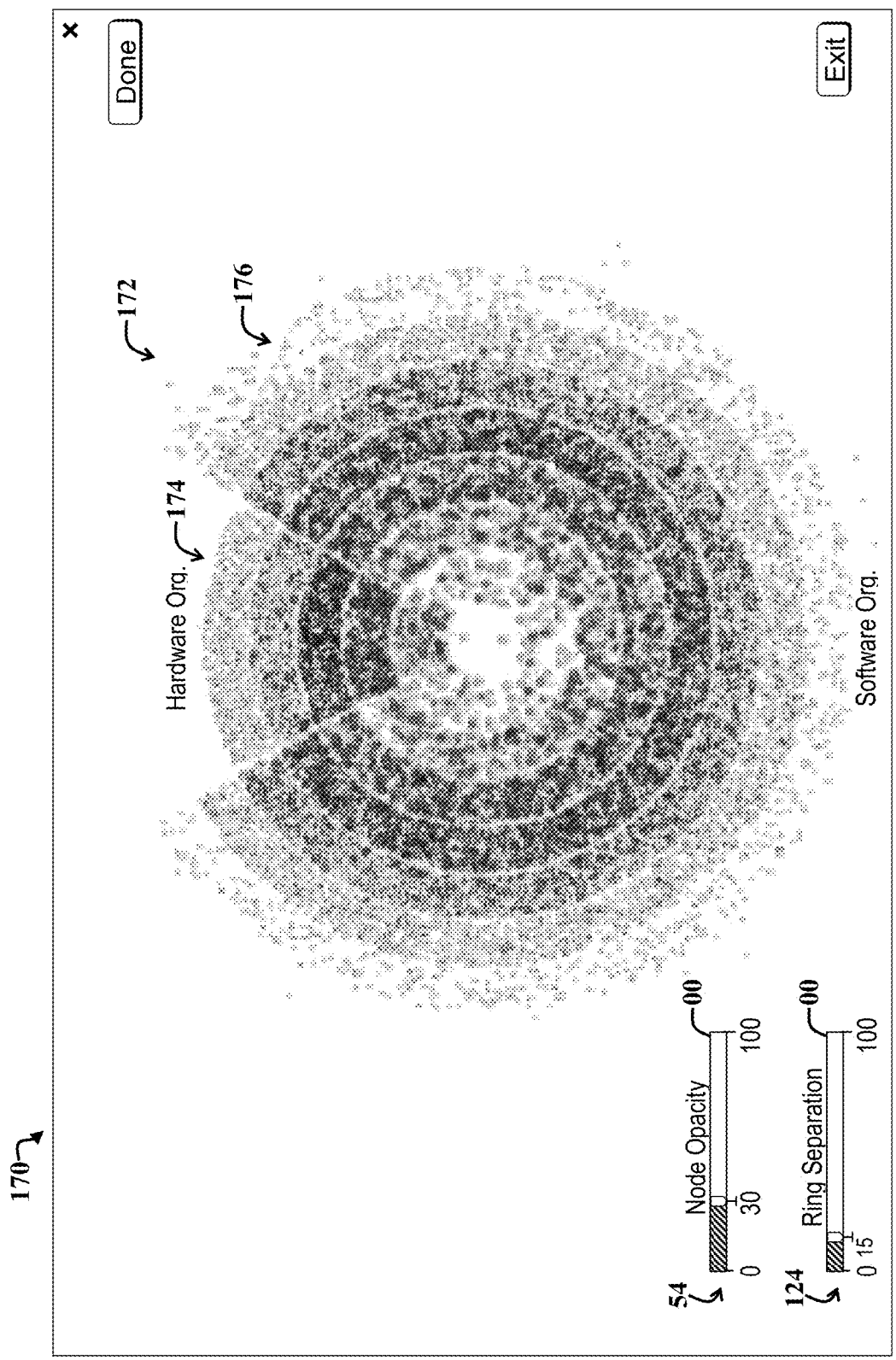
FIG. 12 shows an eleventh example user interface display screen illustrating a galaxy visualization employing angular coding to partition the galaxy visualization into sectors representing different portions of a third enterprise organizational hierarchy.

FIG. 12 shows an eleventh example user interface display screen 170 illustrating a sectored galaxy visualization 172 employing angular coding to partition the galaxy visualization 172 into sectors representing different portions of a third enterprise organizational hierarchy. The example sectored galaxy visualization 172 includes a first sector 174 representing nodes corresponding to enterprise personnel of a hardware portion of an enterprise organization, and a second sector 176 representing nodes corresponding to enterprise personnel of a software portion of the enterprise organization.

Employing sectors to implement attribute encoding may facilitate visually distinguishing and comparing internal structures of organizations. Note that in certain implementations, the hardware organization and the software organization are displayed separately in adjacent galaxy visualizations. Furthermore, additional user interface controls may enable users to convert a sectored galaxy visualization into multiple galaxy visualizations corresponding to each sector and/or for converting one or more rings to different sectors or different galaxy visualizations.

Note that while the present example embodiment illustrates use of sectors that include several rings, other implementations are possible. For example, each ring may itself be divided into several sub-sectors, such that the resulting galaxy visualization would implement a type of sunburst visualization.

Note that certain embodiments may be implemented by randomizing or otherwise distributing nodes in different sections of a sunburst visualization. Furthermore, additional user options may enable performing pivoting, sorting, and filtering operations on visualization compartments or regions of certain embodiments discussed herein. Sunburst visualizations and accompanying examples of operations that may be performed thereon and which may be used to implement various alternative embodiments are discussed more fully in the above-identified U.S. Patent Application (application Ser. No. 13/048,781), entitled VISUALIZATION AND INTERACTION WITH FINANCIAL DATA USING SUNBURST VISUALIZATION which is incorporated by herein by reference.

Figure 13:
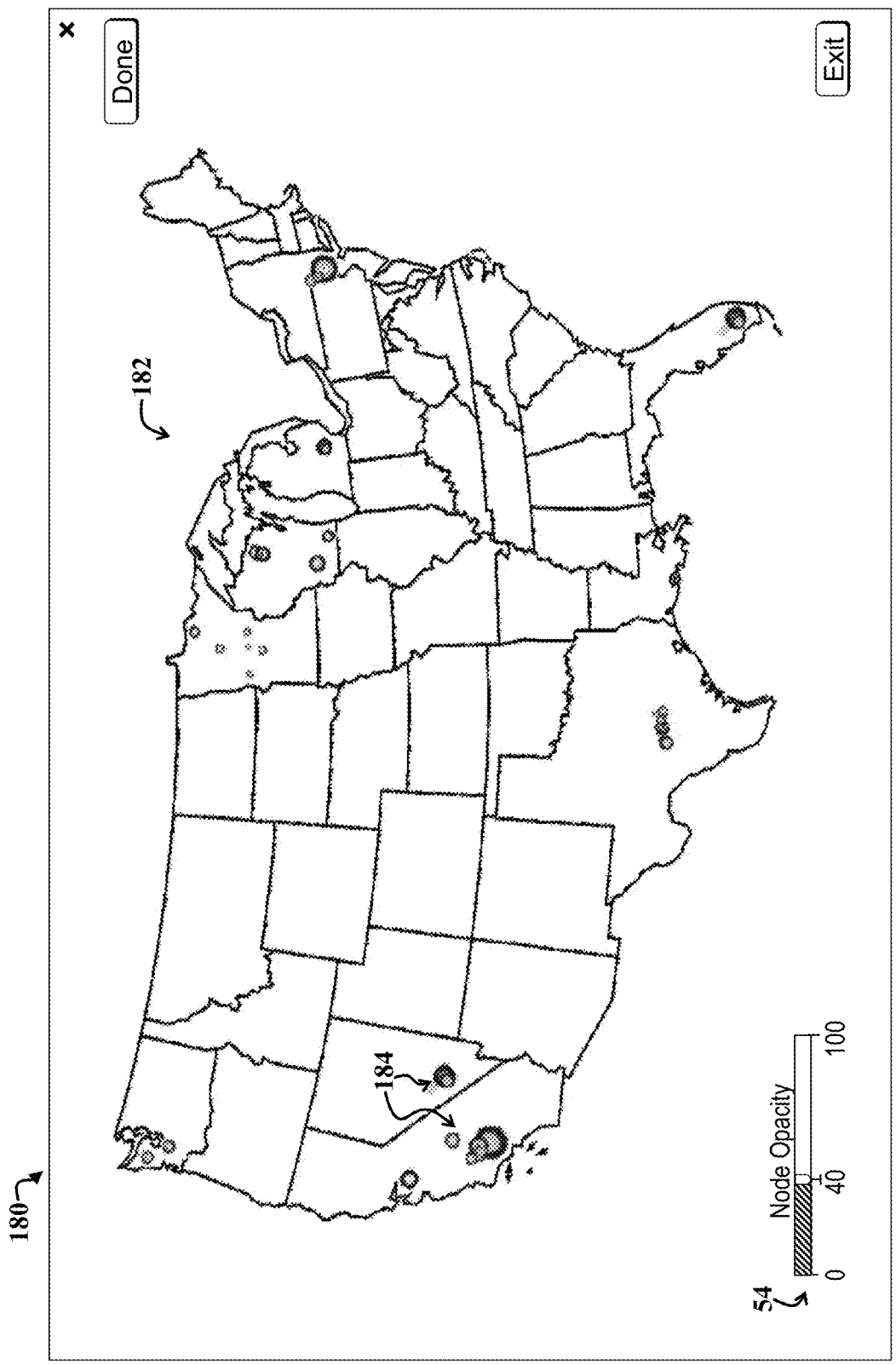
FIG. 13 shows a twelfth example user interface display screen illustrating plural galaxy visualizations positioned on a map.

FIG. 13 shows a twelfth example user interface display screen 180 illustrating plural galaxy visualizations 184 positioned on a map 182. The positions of the galaxy visualizations 184 may correspond to different locations or regions, and each galaxy visualization 184 may illustrate an enterprise hierarchy for an organization at a particular location.

Accordingly, galaxy visualizations as discussed herein may facilitate conveying data organizational information, quantity information, and so on, for thousands of nodes, even when the galaxy visualizations are made relatively small. Furthermore, displaying plural galaxy visualizations in a similar user interface display screen may facilitate juxtaposing such information.

Figure 14:
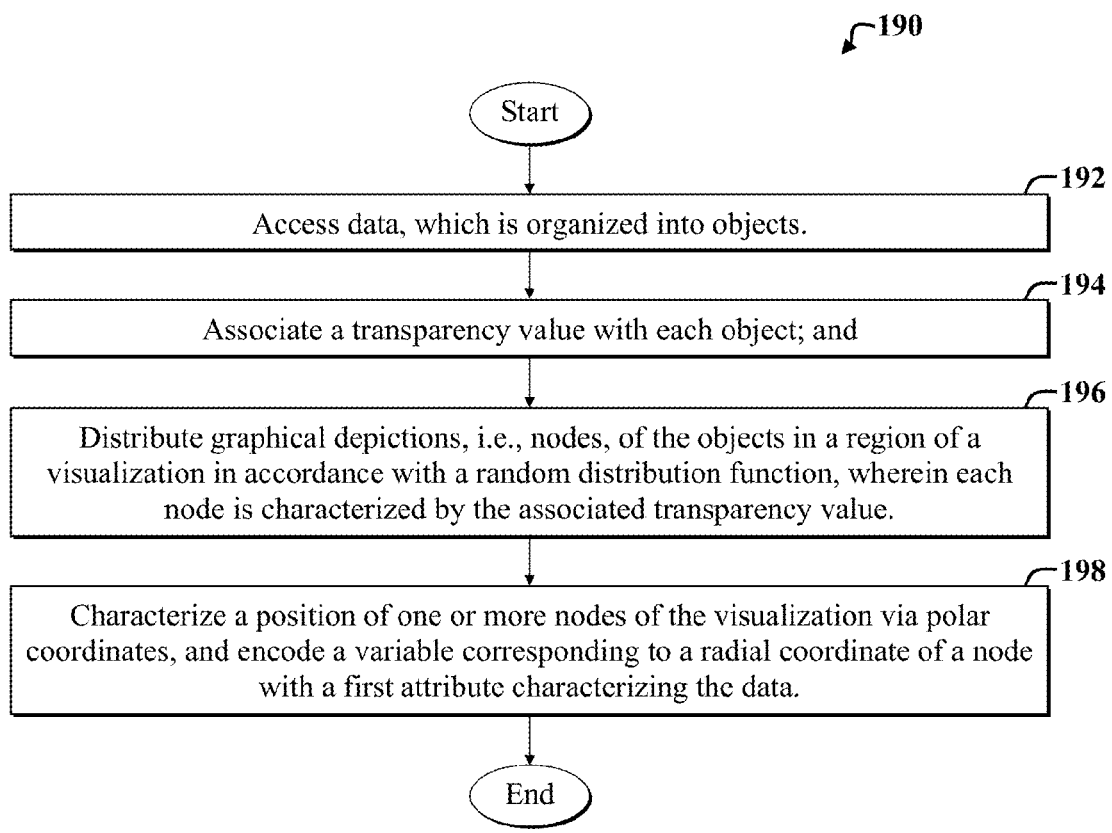
FIG. 14 is a flow diagram of an example method adapted for use with the embodiments of FIGS. 1-13.

FIG. 14 is a flow diagram of an example method 190 adapted for use with the embodiments of FIGS. 1-13. The example method 190 includes an initial step 192, which involves accessing data, wherein the data is organized into objects to be represented via nodes. Alternatively, accessing data includes organizing data into objects if the data has not already been organized into objects suitable to meet the needs of a given implementation.

A second step 194 includes associating a transparency value with each object. Transparency values may be established globally for all nodes of a galaxy visualization, e.g., via use of a transparency slider. Alternatively, transparency values may be adjusted to encode information pertaining to a particular data attribute, such as a data category.

A third step 196 includes distributing graphical depictions of the objects, i.e., nodes, a region of a visualization in accordance with a random or pseudo-random distribution function. Each node is characterized by the associated transparency value established in the second step 194.

A fourth step 198 includes characterizing positions of one or more nodes of the visualization via polar coordinates and encoding a variable corresponding to a radial coordinate of a node with a first attribute, e.g., enterprise hierarchy level, characterizing the data.

Although the description has been described with respect to particular embodiments thereof, these particular embodiments are merely illustrative, and not restrictive. For example, while various embodiments discussed herein are used to visualize data sets characterized by thousands of nodes, embodiments are not limited thereto. Various visualization techniques disclosed herein may be employed to illustrate and provide insight into data characterized by fewer nodes, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for interactively illustrating data in a concentric banded galaxy visualization, the method executing in a computing system, the method comprising:
   accessing data, wherein the data is organized into objects;
   assigning a transparency value to each object;

graphically depicting the data by randomly or partially randomly distributing graphical depictions of the objects in non-overlapping concentric regions of the visualization in accordance with a distribution function, wherein each graphical depiction of an object is characterized by the associated transparency value, wherein overlapping regions of two or more transparent objects are progressively darker as more objects overlap;

receiving a user input to change a separation between a smaller and a larger non-overlapping concentric region of the visualization from a first distance to a second distance; and in response to receiving the user input to change the separation, updating the concentric banded galaxy visualization to display a size difference between an outer radius of the smaller region and an updated inner radius of the larger region equal to the second distance, and to graphically depict objects from the larger region at modified positions in between the updated inner radius and an outer radius of the larger region.

2. The method of claim 1, further including using polar coordinates to implement the distribution function, and characterizing positions of one or more graphical depictions of objects of the galaxy visualization via polar coordinates, such that positions of the graphical depictions of one or more objects are characterized by a radial coordinate and an angular coordinate, and wherein a pole of the polar coordinates is at a center point of the galaxy visualization.

3. The method of claim 2, further including encoding a variable corresponding to a radial coordinate of a graphical depiction of an object with a first attribute characterizing the data.

4. The method of claim 3, wherein the first attribute includes a position level in a hierarchy, such that a first object is characterized by higher position in the hierarchy than a second object when a graphical depiction of the first object is positioned closer to the center point than a graphical depiction of the second object.

5. The method of claim 2, further including encoding a variable corresponding to an angular coordinate of a graphical depiction of an object with a second attribute characterizing the data.

6. The method of claim 5, wherein the second attribute includes a category of an object, wherein one or more graphical depictions of objects of a first category are distributed in a first sector of the galaxy visualization, and wherein one or more graphical depictions of objects of a second category are distributed in a second sector of the galaxy visualization.

7. The method of claim 1, wherein assigning a transparency value to each graphical depiction of an object further includes providing a user option to adjust the transparency value and making each graphical depiction of an object partially transparent in response thereto.

8. The method of claim 1, wherein visually encoding includes adjusting a size of a graphical depiction of an object based on a third attribute.

9. The method of claim 8, wherein the third attribute includes a position in a hierarchy characterizing the data.

10. The method of claim 1, wherein graphically depicting the data further includes providing a user option to filter the data in accordance with a filtering criterion, thereby changing numbers of graphical depictions of objects displayed via the galaxy visualization.

11. The method of claim 1, further including redundantly encoding a fourth attribute of the data in the visualization via a first type of visual encoding and a second type of visual encoding.

12. The method of claim 11, wherein the first type of visual encoding includes adjusting a shape of a graphical depiction of an object based on the fourth attribute.

13. The method of claim 11, wherein the second type of visual encoding includes adjusting a radial coordinate associated with the graphical depiction of an object based on the fourth attribute.

14. The method of claim 1, wherein graphically depicting further includes categorizing the objects into plural categories and distributing graphical depictions of the objects in plural rings of the galaxy visualization, wherein each of the plural rings corresponds to one of the plural categories.

15. The method of claim 14, further including separating each ring, such that a space exists between an outer boundary of a first ring and an inner boundary of a second ring.

16. The method of claim 14, further including distributing graphical depictions of objects in plural sectors of the galaxy visualization, wherein each sector corresponds to one of the plural categories.

17. An apparatus comprising:
a digital processor coupled to a display and to a processor-readable storage device, wherein the processor-readable storage device includes one or more instructions executable by the digital processor to perform the following acts:
accessing data, wherein the data is organized into objects;
assigning a transparency value with each object;
graphically depicting the data by randomly or partially randomly distributing graphical depictions of the objects in non-overlapping concentrically banded regions of a galaxy visualization in accordance with a distribution function, wherein each graphical depiction of an object is characterized by the associated transparency value, wherein overlapping regions of two or more transparent objects are progressively darker as more objects overlap;
receiving a user input to change a separation between a smaller and a larger non-overlapping concentric region of the visualization from a first distance to a second distance; and
in response to receiving the user input to change the separation, updating the concentric banded galaxy visualization to display a size difference between an outer radius of the smaller region and an updated inner radius of the larger region equal to the second distance, and to graphically depict objects from the larger region at modified positions in between the updated inner radius and an outer radius of the larger region.

18. A processor-readable storage device including instructions executable by a digital processor, the processor-readable storage device including one or more instructions for:
accessing data, wherein the data is organized into objects;
assigning a transparency value with each object;
graphically depicting the data by randomly or partially randomly distributing graphical depictions of the objects in non-overlapping concentrically banded regions of a galaxy visualization in accordance with a distribution function, wherein each graphical depiction of an object is characterized by the associated transparency value, wherein overlapping regions of two or more transparent objects are progressively darker as more objects overlap;
receiving a user input to change a separation between a smaller and a larger non-overlapping concentric region of the visualization from a first distance to a second distance; and in response to receiving the user input to change the separation, updating the concentric banded galaxy visualization to display a size difference between an outer radius of the smaller region and an updated inner radius of the larger region equal to the second distance, and to graphically depict objects from the larger region at modified positions in between the updated inner radius and an outer radius of the larger region.

\* \* \* \* \*

UNITED STATES PATENT AND TRADEMARK OFFICE
CERTIFICATE OF CORRECTION

PATENT NO. : 9,105,118 B2
APPLICATION NO. : 13/726084
DATED : August 11, 2015
INVENTOR(S) : Molesky et al.

Page 1 of 1

It is certified that error appears in the above-identified patent and that said Letters Patent is hereby corrected as shown below:

On page 2, column 2, item (56), under Other Publications, line 1, delete "animatroid." and insert -- antimatroid. --, therefor.

Signed and Sealed this
First Day of March, 2016

Michelle K. Lee
*Director of the United States Patent and Trademark Office*